United States Patent [19]
Bayle

[11] 3,745,850
[45] July 17, 1973

[54] RACK AND PINION STEERING GEAR

[75] Inventor: Robert Vincent Bayle, Ecquevilly, France

[73] Assignee: Gemmer-France, Hauts-de-Seine, France

[22] Filed: Dec. 8, 1971

[21] Appl. No.: 205,961

[30] Foreign Application Priority Data
Dec. 11, 1970 France .............................. 7044862

[52] U.S. Cl. .................................. 74/422, 74/498
[51] Int. Cl. ........................... F16h 1/04, B62d 1/20
[58] Field of Search ............................ 74/422, 498

[56] References Cited
UNITED STATES PATENTS
| | | | |
|---|---|---|---|
| 3,572,157 | 3/1971 | Adams et al. | 74/422 X |
| 3,421,387 | 1/1969 | Adams | 74/498 |
| 3,505,898 | 4/1970 | Bradshaw | 74/422 X |
| 3,572,158 | 3/1971 | Adams | 74/422 X |
| 3,630,099 | 12/1971 | Miyoshi | 74/422 X |

Primary Examiner—Leonard H. Gerin
Attorney—Carlton Hill, Donald J. Simpson, et al.

[57] ABSTRACT

A rack and pinion assembly for automotive steering gear having a generally T-shaped tubular housing with a rack bar slidably supported through one leg thereof and a pinion meshed with the rack teeth rotatably mounted in the other leg thereof on plastic bearings adjacent the ends of the pinion teeth and having one of the bearings loaded by a plug threaded in the housing to prevent axial shifting of the pinion. In one form the loaded plastic bearing is a ball and socket joint. In a second form, the loaded plastic bearing cooperates with a thrust bearing at the opposite end of the pinion teeth. In a third form, the pinion has a fixed radial collar between loaded plastic bearings. The plastic bearings absorb vibration and dampen road shock.

9 Claims, 3 Drawing Figures

RACK AND PINION STEERING GEAR

BACKGROUND OF THE INVENTION

1. Field of the Invention

This invention relates to rack and pinion steering gear and particularly to bearing mountings for the pinion which are composed of plastic and are adjustable to control the position of the pinion relative to the rack, while at the same time damping out vibration and transfer of road shock.

2. Description of the Prior Art

It is known that in a steering box with a helicoidal pinion engaging with a rack with straight teeth inclined with respect to its axis, the said pinion, rigidly fixed to the steering column, is essentially supported in the three possible following ways:

-either by a simple bearing on the steering wheel side- (and in consequence above the toothed rack), and by a ball-bearing mounted below the toothed rack, the said ball-bearing being housed in a small casing;

-or by a ball-bearing on the steering-wheel side and a ball-bearing on the other side of the toothed rack;

-or alternatively by oblique contact bearings on the steering wheel and toothed-rack sides.

While these arrangements enable the steering pinion to absorb fairly easily the longitudinal forces and the transverse forces which may be transmitted to it by the toothed rack due to the effect of the lateral forces which can be applied on the steering wheel, they nevertheless permit the existence of a certain transverse but especially longitudinal clearance in the steering column which results in a certain play between the helicoidal pinion and the toothed rack in the first two cases. This play is not only detrimental to the damping of the steering reactions, but is also becomes impossible to take it up during wear and results in vibration and noise coming from the steering. In the third case, these conditions are obtained, but without damping, since the rotational torque of the pinion is independent of the speed of rotation of the pinion, which remains substantially constant.

SUMMARY OF THE INVENTION

The present invention obviates the drawbacks of the prior art by providing a device which permits very easy absorption of the longitudinal and transverse forces to which the steering gear is subjected and permits operation without looseness or play, while at the same time providing good dampening of the steering vibrations and reactions. The device of this invention is adjustable to ensure smooth steering, will filter out vibrations or road shock, and will take up wear developed during use.

The articulation device for the steering of an automobile vehicle according to the invention is essentially characterized by the fact that it is constituted by a metallic body of revolution about the axis of the steering column and movable in rotation about the said axis, and which forms the extension of the helicoidal pinion rigidly fixed to the said column beyond the member driven by this pinion, the said metal part being placed in a housing, the internal surface of which follows the shape of its external surface, no play existing between the two said surfaces, a thin film of lubricant being interposed between these same two surfaces, the part forming the housing of the metallic body of revolution rigidly fixed to the steering box being supported on the one hand on the shoulder separating the helicoidal pinion proper from the said body of revolution, and on the other hand on the internal face of a clamping nut cooperating with a threaded portion formed in the corresponding extremity of the steering box, the part forming the housing of the metallic body of revolution being made of a synthetic material.

According to a first form of embodiment, the metal body of revolution is constituted by a ball joint directly fixed on the extension of the corresponding extremity of the helicoical pinion, the center of the said ball joint being placed on the common axis of the steering column and the said pinion.

According to a second form of embodiment, the metal body of revolution is constituted by a cylindrical rod coaxial with the steering column and the helicoidal pinion, while the part forming the housing of the said body of revolution is constituted by a sleeve which is coaxial to it.

According to a third form of embodiment, the metal body of revolution is constituted by a cylindrical rod coaxial with the steering column and the helicoidal pinion, provided at its extremity with a metal washer which is coaxial with it, while its housing is constituted by an assembly of two sleeves, the first of these two sleeves surrounding the cylindrical metal part being interposed between one transverse face of the washer and the junction shoulder of the helicoidal pinion of the cylindrical part, the second said sleeve being interposed between the other transverse face of the metal washer and the internal face of the clamping nut.

According to other characteristic features:

-The synthetic material from which is made the part forming the housing of the metal body of revolution is preferably a polyethylene or an acetal resin;

-The lubricant interposed in a thin layer between a surface of the metal body of revolution and the surface of its housing is a lubricant which has a high resistance to pressure.

Other characteristic features and advantages of the invention will be more clearly brought out in the description which follows below, by way of example and not in any limitative sense, of possible forms of embodiment of the said invention, reference being made to the accompanying drawings.

DESCRIPTION OF THE PREFERRED EMBODIMENTS

Figure 1:
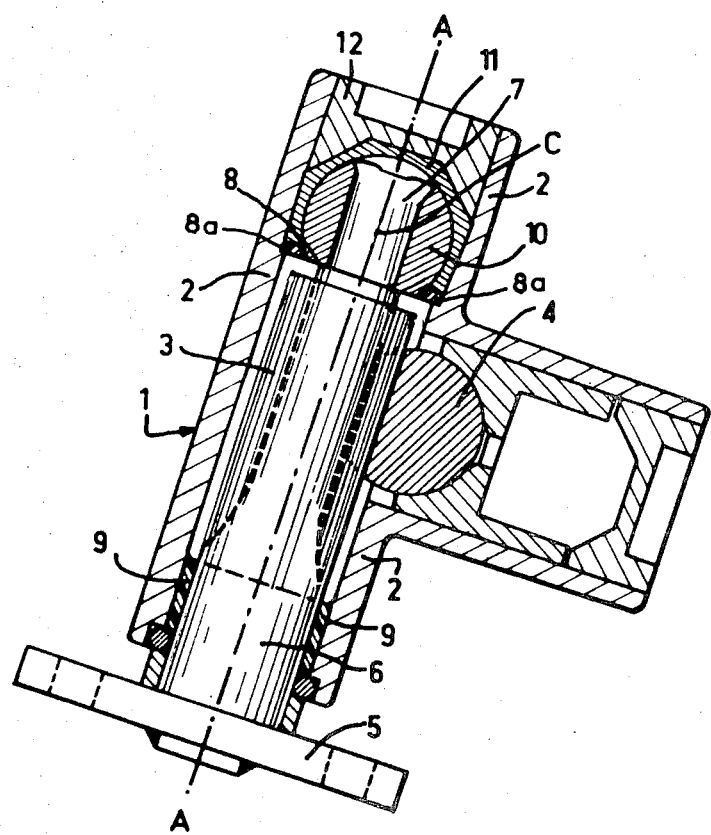
FIG. 1 represents a view in axial section of an articulation device for the steering of an automobile vehicle with a ball joint, according to the invention.

In the three figures of the drawings, identical reference numerals have been used to represent the same or equivalent components.

In FIG. 1 the illustrated rack and pinion assembly includes a generally T-shaped pipe-like housing 1 in the upper leg or arm 2 of which is mounted a helicoidal pinion 3 engaged with a toothed rack slidably mounted by appropriate known means carried in the other arm or leg of the housing 1. The rack extends through the housing and, as is known, is connected through linkages to the wheels to be steered so that when the pinion 3 is rotated the rack 4 will be shifted longitudinally to effect steering. The pinion 3 has one end extending through the housing 2 terminating in a flange 5 forming part of a joint (not shown) to the steering shaft (not shown). The pinion has a cylindrical portion 6 at one end of the helicoidal teeth thereof and a reduced diameter cylindrical free end portion 7 coaxial with the portion 6 and at the opposite end of the helicoidal teeth. A radial shoulder 8 is provided at the base of the cylindrical free end portion 7.

The cylindrical portion 6 is mounted at its input end in the upper arm or leg of the housing 2 in a sleeve 9 made of an appropriate synthetic plastics material such as a polyethylene, which may advantageously be that sold commercially under the name of "Manolene" or by an acetal resin which may advantageously be that sold commercially under the name of "Delrin." The sleeve 9 is pressed into the inlet portion of the housing 1 with no play between its inner face and the cylindrical portion 6.

The cylindrical rod-like free end 7 of the pinion is fixedly mounted in a ball 10 composed of hard material such as steel. The steel ball is bottomed on the shoulder 8 and clamped in fixed position on the rod-like portion 7 by enlarging or riveting the end face of the rod portion 7 over the end of the ball as shown. The center C of the ball is on the axis A—A of the pinion 3.

The ball 10 is mounted in the spherical internal socket portion of a bearing housing 11 that is composed of a suitable plastic material such as for example polyethylene or an acetal resin. The housing or socket 11 embraces the ball 10 and is bottomed on a washer 8a in the housing. An adjusting screw plug 12 threaded in the housing plate 2 overlies the plastic socket 11 for the ball 10. It will be noted that the bore of the housing portion 2 receiving the plastics socket member or bearing 11 is of slightly frusto-conical shape converging toward the pinion so that when the plug 12 is forced against the housing 11, the housing will be radially as well as axially loaded to maintain a good mating bearing contact with the ball member 10.

The swivel joint pivoting of the free end 7 of the pinion 3 provides a ball-bearing in which all looseness or play can be taken up by the plug 12 and axial shifting of the pinion 3 is prevented.

The plastic bearings 9 and 11 will filter out vibrations and road shock in the assembly and will also provide a dampening effect since resistance to steering is an increasing function of the speed of rotation of the pinion, whereas in the case of a ball bearing support the resistive couple is substantially constant. Further, the resistive couple provided by the ball joint or swivel joint remains practically constant at low speed and tends to decrease when force is applied longitudinally on the toothed rack 4. Of course, the adjustment of the plug 12 makes possible the maintenance of smooth steering as well as wear take-up.

Figure 2:
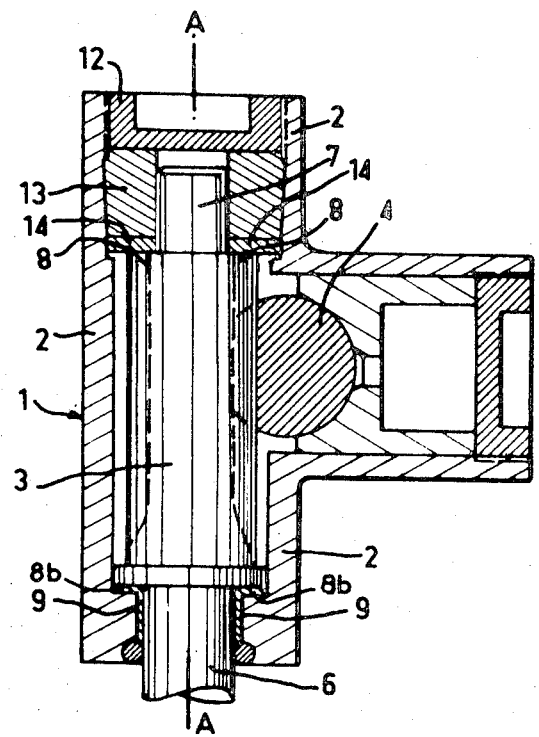
FIG. 2 represents a view in axial section of an articulation device for the steering of an automobile vehicle according to another form of embodiment of the invention.

In the modification of FIG. 2, the cylindrical rod-like free end portion 7 of the pinion 8 is received in a plastic sleeve 13 that is pressed in the tapered bore of the housing by the threaded plug 12. The sleeve 13 is composed of the same plastics material as the bearing socket 11 and is also seated in the frusto-conical bore of the housing leg portion 2 being bottomed on a washer 14 which is also bottomed on the shoulder 8 at the base of the rod-like end portion 7. If desired, the plastic bearing 13 could be bottomed directly on this shoulder 8.

The bearing 9 has a flange or end face 8b receiving a radial shoulder on the pinion 3 so that end play of the pinion 3 will be taken up when the plug 12 forces the plastic bearing 13 toward this flange or bearing face 8b. In this embodiment, therefore, the pinion 3 is adjustably clamped against unwanted axial shifting between the washer 14 and the bearing face 8b.

Figure 3:
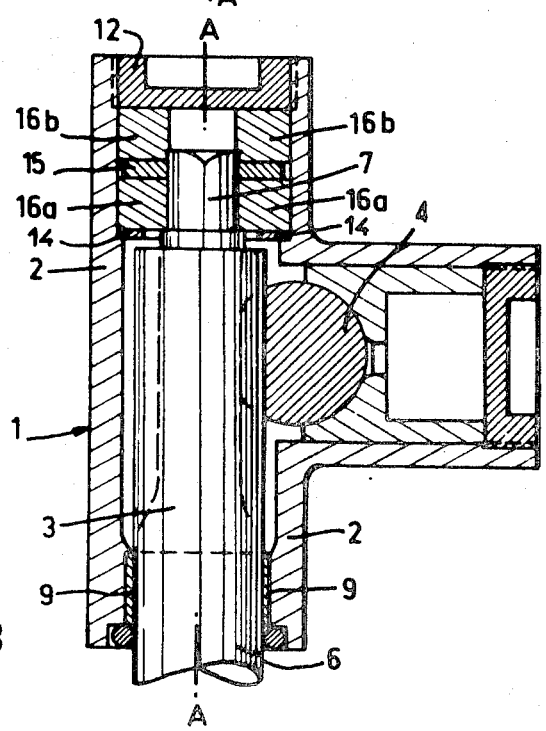
FIG. 3 shows a view in axial section of an articulation device for the steering of an automobile vehicle according to a third form of embodiment of the invention.

In FIG. 3, the rod-like free end 7 of the pinion3 has a metal washer 15 fixed thereon by any suitable means such as by riveting. This washer 15 is gripped between the opposite side faces of two bearing sleeves 16a and 16b in the leg 2 of the housing 1. The sleeve 16a is bottomed on a washer 14 in the housing and the sleeve 16b is engaged by the screw plug 12 so that tightening of the plug will clamp the washer 15 between the bearing sleeves 16a and 16b to hold the pinion 3 against axial shifting.

The sleeves 16a and 16b are made of synthetic plastic materials of the same type used for the bearings in FIGS. 1 and 2.

The mating bearing faces of the ball 10 and socket 11 in FIG. 1 and of the pin 7 and bearing sleeve 13 in FIG. 2, and of the washer 15 and bearing sleeves 16a and 16b in FIG. 3 are lubricated with a lubricant that withstands high pressures so that a film of lubricant will be maintained between the bearing surfaces.

From the above descriptions, it will therefore be understood that the invention provides a rack and pinion assembly especially suitable for automotive steering gear wherein the pinion is rotatably supported in plastic bearings and is held against undesired axial shifting by an adjustable loading of a bearing for the free end of the pinion.

I claim as my invention:

1. A rack and pinion assembly useful in automotive steering gear which comprises a housing, a pinion in said housing having a shaft portion on one end thereof projecting through the housing and a free end portion on the other end thereof terminating in the housing with pinion teeth between said shaft and free end portions, a rack slidably mounted in said housing having teeth meshed with the pinion, a first plastics sleeve bearing in said housing rotatably supporting said shaft portion of the pinion, a second radial and thrust plastics bearing in said housing rotatably supporting said free end portion of the pinion, and means adjustably mounted in the housing loading said second bearing to hold the pinion against axial shifting in the housing.

2. The rack and pinion assembly of claim 1 wherein the housing is T-shaped having a first open end leg receiving the first and second bearings in the ends thereof and a second dependent leg between the ends of the first leg receiving the mounting for slidably supporting the rack and the means adjustably mounted in the housing loading the second bearing is a screw plug threaded in the open end of the first leg adjacent the second bearing and thrusting against the second bearing.

3. The assembly of claim 1 wherein the second bearing is a ball and socket joint having the ball member secured on said free end portion and the socket enveloping the ball is composed of plastic.

4. The rack and pinion assembly of claim 3 wherein the plastic bearing enveloping the ball is loaded by a screw plug threaded in the housing.

5. A rack and pinion steering gear which comprises a T-shaped housing having a first leg rotatably mounting a pinion and a second leg depending therefrom carrying a slide support for a rack bar extending through the housing in meshed engagement with the pinion, said pinion having a cylindrical free end portion in one end of said first leg of the housing, a plastic bearing in said one end of said first leg of the housing rotatably supporting said free end portion of the pinion, and means in said housing loading said plastic bearing to hold the pinion against axial shifting relative to the rack.

6. A rack and pinion assembly useful in automotive steering gear which comprises a housing, a pinion in said housing having a shaft portion on one end thereof projecting through the housing and a free end portion on the other end thereof terminating in the housing with pinion teeth between said shaft and free end portions, a rack slidably mounted in said housing having teeth meshed with the pinion, a first sleeve bearing in said housing rotatably supporting said shaft portion of the pinion, a second ball and socket joint bearing having a ball member secured on the free end portion of the pinion and a plastic socket enveloping the ball, said housing having a tapered bore converging toward the pinion receiving said plastic socket, and a screw plug threaded in the housing loading said socket toward the converging end of the tapered bore.

7. A rack and pinion assembly useful in automotive steering gear which comprises a housing, a pinion in said housing having a shaft portion on one end thereof projecting through the housing and a free end portion on the other end thereof terminating in the housing with pinion teeth between said shaft and free end portions, a rack slidably mounted in said housing having teeth meshed with the pinion, a first plastics bearing in said housing rotatably supporting said shaft portion of the pinion, a second plastics bearing in said housing rotatably supporting said free end portion of the pinion, said first plastics bearing being a plastic sleeve with an end flange against which the pinion abuts and said second plastics bearing being a sleeve thrusting against the opposite end of the pinion to clamp the pinion between the two bearings, and means adjustably mounted in the housing loading said second bearing to hold the pinion against axial shifting in the housing.

8. A rack and pinion assembly useful in automotive steering gear which comprises a housing, a pinion in said housing having a shaft portion on one end thereof projecting through the housing and a free end portion on the other end thereof terminating in the housing with pinion teeth between said shaft and free end portions, a rack slidably mounted in said housing having teeth meshed with the pinion, a first plastics bearing in said housing rotatably supporting said shaft portion of the pinion, said housing having a tapered bore surrounding the free end of the pinion, a second plastics beasing sleeve wedged in said tapered bore rotatably supporting the free end portion of the pinion, and means adjustably mounted in the housing loading the second plastics bearing sleeve to hold the pinion against axial shifting in the housing.

9. A rack and pinion assembly useful in automotive steering gear which comprises a housing, a pinion in said housing having a shaft portion on one end thereof projecting through the housing and a free end portion on the other end thereof terminating in the housing with pinion teeth between said shaft and free end portions, a rack slidably mounted in said housing having teeth meshed with the pinion, a first plastics bearing in said housing rotatably supporting said shaft portion of the pinion, a radial washer fixed on the free end portion of the pinion, two plastics sleeves on opposite sides of the washer rotatably supporting the free end of the pinion, and means adjustably mounted in the housing loading the plastics sleeves to hold the pinion against axial shifting in the housing.

* * * * *